Nov. 10, 1970 D. J. LOGAN 3,539,966
MICROWAVE CONNECTOR
Filed July 23, 1968
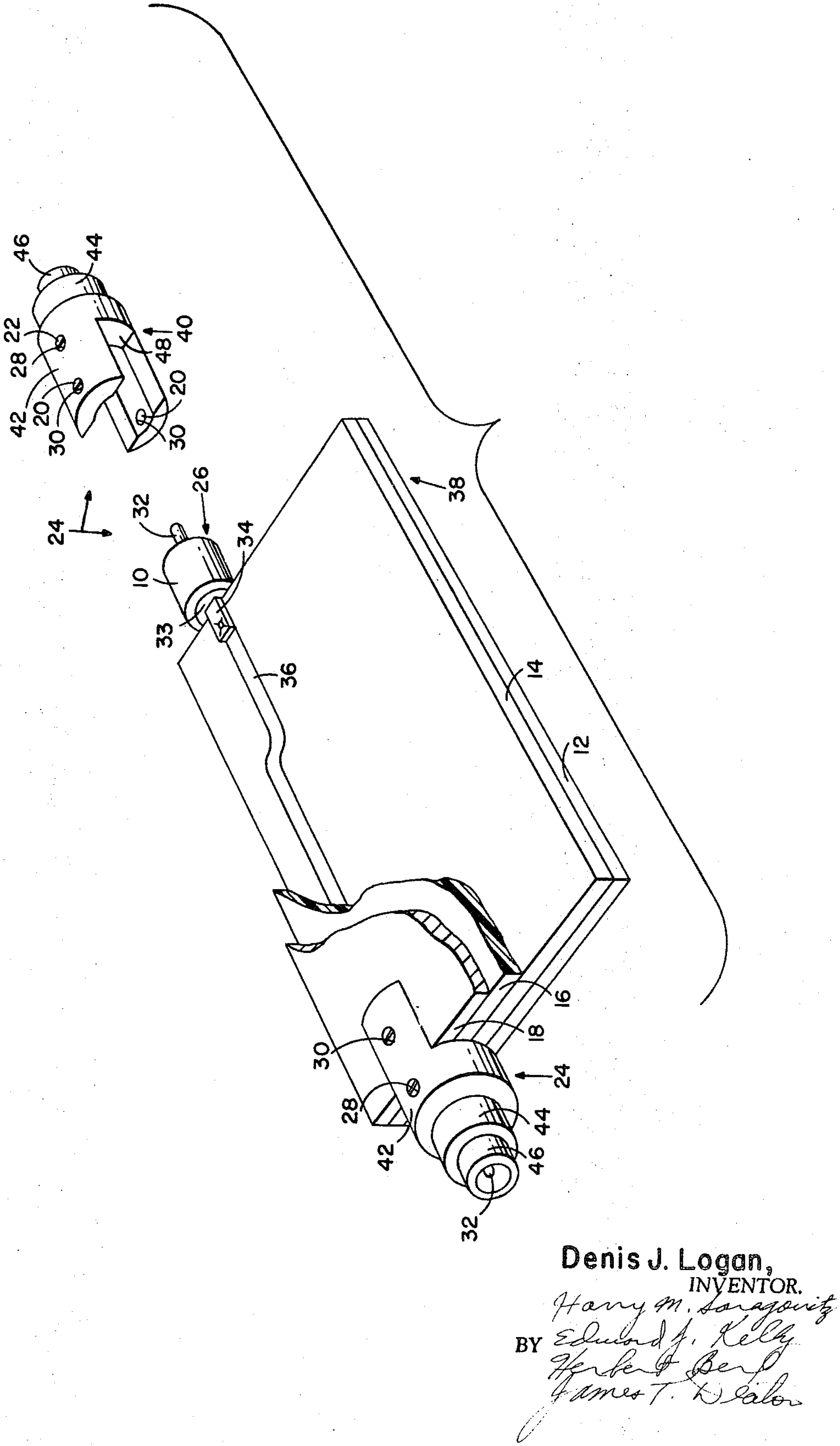
Denis J. Logan,
INVENTOR.
BY Harry M. Saragovitz
Edward J. Kelly
Herbert Berl
James T. Dialon

United States Patent Office 3,539,966
Patented Nov. 10, 1970

3,539,966

MICROWAVE CONNECTOR

Denis J. Logan, Huntington Station, N.Y., assignor, by mesne assignments, to the United States of America as represented by the Secretary of the Army Filed July 23, 1968, Ser. No. 746,824
Int. Cl. H01r *17/04;* H05k *1/07*
U.S. Cl. 339—17 4 Claims

ABSTRACT OF THE DISCLOSURE

A strip transmission line-to-coaxial line connector which can be attached to etched strip transmission line circuits. A coaxial line adapter is visually aligned and resistance soldered in place on the etched strip transmission line with an outer shell assembly clamped over the adapter for connecting to a coaxial cable and held in place by three set screws.

BACKGROUND OF THE INVENTION

Miniaturization of strip transmission line-to-coaxial line connectors has presented problems in microwave connectors as the circuitry has increased. Since the advent of phased array radars, the increase in strip transmission line components has increased considerably, often running into thousands for a single radar system. A strip transmission line circuit normally is comprised of two dielectric slabs, one with an etched circuit on its face, and two ground planes. Coaxial lines are usually employed to marry coaxial components to strip transmission line components and to join transmission line components to strip transmission line components where simple lap joints cannot be used. The connectors which mount on the strip transmission line components are sometimes called launchers. These connectors contain transitions which take the electrical signal in a coaxial mode and launch it in a strip transmission line mode without severe impedance mismatch. The use rate of such connectors is bound to increase over the coming years; therefore, it is important that a simple and inexpensive strip line-to-coaxial line connector be used.

The connectors presently available on the market require holes in the circuit board drilled accurately with respect to the etched circuit. It is these holes which align the connector tab with the etched circuit to insure proper electrical performance. Setting up to drill these holes usually must be done by optical means, since the etched circuit is only about 0.002 inch thick. Matched holes are required in the dielectric slab and the two ground planes. Another disadvantage of previous connectors is that three parts and eight screws are used.

SUMMARY OF THE INVENTION

The present invention comprises a strip transmission line-to-coaxial line connector which can be attached to etched strip transmission line circuits without the necessity of expensive machining of accurately positioned holes in the circuit board. The coaxial line adapter or launcher of the invention may be visually aligned with the printed circuit and fastened in place using a conventional resistance soldering technique at a high production rate. The outer shell of the launcher is a separable part which is put into place after the circuit boards are assembled and is held in place by the clamping action of set screws against the printed circuit ground planes.

The electrical transition of the improved launcher of the connector is essentially the same as in the past, but the mechanical manner in which the connector launcher mounts is unique in two respects. First, the transition section with its center conductor and launcher tab are mounted in a bushing which can be mounted to the circuit board independent of the outer shell of the connector and without a requirement for mounting holes. The transition tab is visually aligned to the circuit and fastened in place by automatic resistance soldering. No machining is required on the boards for the specific purpose of mounting connectors. Second, the outer connector shell is mounted without a requirement for holes in the strip transmission line assembly. After the dielectric slabs and ground planes are put in place, the shell is slid over the transition bushing and held in place by two set screws which grip the circuit ground planes. A third set screw is used to prevent bushing rotation. It is possible to use dimpling or other methods to replace the set screw functions.

The outer shell and bushing is suitable for production on automatic machinery, reducing the cost of the present connector. The launcher-connector described can be utilized for connector-launchers which employ a variety of coaxial connector types such as Type N, TNC, BNC, etc.

An object of the present invention is to provide an improved transition section for a strip transmission line-to-coaxial line connector that can be attached to etched strip transmission line circuits without the necessity of expensive machining of accurately positioned holes in the circuit board.

A further object of the present invention is to provide a visual means of aligning the coaxial line launcher with the printed circuit and fastening in place using conventional resistance soldering methods at a high production rate.

A still further object of the present invention is to provide an outer connector shell that can be mounted over a bushing holding the transition section and be held in place by two set screws that grip the strip transmission line circuit ground planes with a third set screw preventing the bushing from rotating.

Another object of the present invention is to provide an outer shell and bushing of a microwave connector that is suitable for production on automatic machinery, reducing the cost of the connector.

Other objects and many of the attendant advantages of this invention will become apparent as the same becomes better understood by reference to the following detailed description of the preferred embodiment when considered in connection with the accompanying drawing.

BRIEF DESCRIPTION OF THE DRAWING

The figure of the drawing is a greatly exploded, generally pictorial view showing a preferred embodiment of the improved microwave connector with the coaxial connectors being connected to a section of strip transmission line.

DESCRIPTION OF THE PREFERRED EMBODIMENT

Referring now to the figure, one complete connection of the strip transmission line-to-coaxial line connector 24 is shown mounted to strip transmission line 38. The components of a second connector 24 are shown with electrical transition section 26 in connection with lower dielectric board 14 of the strip transmission line 38 and outer container shell 40 confronting but out of engagement with the electrical transition section 26 and strip transmission line 38. The electrical transition section 26 comprises a launcher tab 34 and a center conductor 32 centrally located and extending out from opposite ends of circular transition bushing 10. The launcher tab 34 and center conductor 32 are interconnected to each other and are enclosed by a layer of insulation material 33 surrounded by transition bushing 10.

The outer container shell 40 has a generally cylindrical shape with an outer stepped taper section having three outer dimensions designated as a large end 42, an intermediate section 44 and a small end 46. The outer container shell 40 has a hollow center bore through its longitudinal center portion with a large bore located within the large end 42 and the intermediate section 44 of the outer taper section. A small bore is enclosed within the small end 46 of the outer taper section. The large bore of the outer container shell 40 is adapted to contain the electrical transition section 26. The small bore of the outer container shell 40 is smaller than the transition bushing 10 and is used as a stop for the electrical transition section 26 and to centrally locate center conductor 32 within small end 46.

The large end 42 of outer container shell 40 is provided with two transverse cutouts forming two jaws. The dimension of the cutouts are the same as the width of the strip transmission line 38 and have a base section 48 for fitting flush against the strip transmission line. Outer connector shell 40 and electrical transition section 26 are dimensioned such that with base section 48 flush against the strip transmission line, the electrical transition section 26 fits snugly inside the outer container shell 40.

In assembling, the launcher tab 34 is resistance soldered to etched circuit 36 on one side of lower circuit board 14 of strip transmission line 38. Before welding, the launcher tab 34 and etched circuit 36 are easily aligned visually. The electrical transition section 26 is then mounted on the etched circuit board independent of the outer container shell 40 and without a requirement for mounting holes, as previously employed. After soldering the electrical transition section 26 to etched circuit 36 on the lower dielectric board 14, the lower ground plane 12, upper dielectric board 16 and upper ground plane 18 are further connected together in a conventional manner. With the strip transmission line 38 and electrical transition section 26 connected together, the outer container shell 40 is slid over transition bushing 10. The outer container shell 40 slips over the strip transmission line 38 until the strip transmission line fits flush against base section 48 of the cutouts of the outer container shell. At the same time the transition bushing 10 is stopped by the small bore enclosed within the small end 46 of outer container shell 40. The outer container shell 40 is held firmly to the strip transmission line 38 by two set screws 20 mounted through threaded mounting holes 30. A third set screw 22, placed through threaded mounting hole 28, is used to prevent relative rotation between transition bushing 10 and container shell 40. When outer container shell 40, electrical transition section 26 and strip transmission line 38 are connected together in the above manner, center conductor 32 is centrally positioned within the small bore of the small end 46 of outer container shell 40 for easy connect-disconnect to a coaxial line.

Obviously many modifications and variations of the present invention are possbile in the light of the above teachings. It is therefore to be understood that within the scope of the appended claims the invention may be practiced otherwise than as specifically described.

I claim:

1. A microwave connector for coupling electrical energy between strip transmission line and coaxial conductor comprising in combination: an electrical transition section having an electrical connection launcher tab and center conductor centrally positioned inside a cylindrical transition bushing and connected to each other, said launcher tab extending out one end of said cylindrical transition bushing and said center conductor extending out the opposite end of said cylindrical transition bushing; a generally cylindrical outer container shell having three outer stepped taper sections defined as large, intermediate and small taper sections and a circular inner opening having a large and a small diameter stepped bore with a transverse cutout at said large bore forming an upper and a lower jaw extending substantially through said large taper section, said cylindrical transition bushing fitting in said large diameter stepped bore flush with the inner end of said transverse cutouts at the one end and against said small diameter stepped bore at the opposite end; a strip transmission line having two inner dielectric layers and two outer metallic layers, with one of said inner layers having an etched circuit on one side; and said launcher tab is adapted for attachment to said etched circuit and whereby the strip transmission line is assembled with said launcher tab positioned between dielectric inner layers and said outer metallic layers covering said inner layers, said upper and lower jaws fitting over the assembled strip transmission line and enclosing said electrical transition section, and said small bore enclosing said center conductor of said electrical transition section whereby said center conductor is adaptable for connection to a coaxial line.

2. A microwave connector as set forth in claim 1 wherein said outer container shell includes set screws and mounting arrangements for connecting said outer container shell to the strip transmission line for preventing rotation of said transition bushing.

3. A microwave connector as set forth in claim 2 wherein said set screws include one set screw for connecting said upper jaw and a second set screw for connecting said lower jaw to the strip transmission line and a third set screw for connecting through said upper jaw to retain said electrical transition section.

4. A microwave connector as set forth in claim 3 wherein said launcher tab and center conductor are insulated from said cylindrical transition bushing by insulation between said cylindrical transition bushing and said tab and center conductor.

References Cited

UNITED STATES PATENTS

| | | | |
|---|---|---|---|
| 2,946,024 | 7/1960 | Mills. | |
| 3,013,227 | 12/1961 | Jordan. | |
| 3,201,722 | 8/1965 | May et al. ---------- | 333—84 |

FOREIGN PATENTS

| | | |
|---|---|---|
| 235,047 | 2/1960 | Australia. |

MARVIN A. CHAMPION, Primary Examiner

P. A. CLIFFORD, Assistant Examiner

U.S. Cl. X.R.

333—84; 339—177